United States Patent
Adrian et al.

[11] 3,904,002
[45] Sept. 9, 1975

[54] HYDROPNEUMATIC VIBRATION DAMPER

[75] Inventors: Adolf Adrian; Johannes Jasper De Baan, both of Ennepetal, Germany

[73] Assignee: Firma August Bilstein, Ennepetal, Germany

[22] Filed: June 6, 1974

[21] Appl. No.: 476,774

[30] Foreign Application Priority Data
June 22, 1973 Germany............................ 2331852

[52] U.S. Cl. .............................................. 188/269
[51] Int. Cl. ............................................... F16f 9/40
[58] Field of Search ............................. 188/269, 322

[56] References Cited
UNITED STATES PATENTS

| | | | |
|---|---|---|---|
| 3,164,381 | 1/1965 | Tuczek | 188/269 X |
| 3,225,870 | 12/1965 | Heckethorn | 188/269 |
| 3,750,855 | 8/1973 | Peddinghaus | 188/269 |

FOREIGN PATENTS OR APPLICATIONS
900,061 12/1953 Germany ........................... 188/322

Primary Examiner—George E. A. Halvosa
Attorney, Agent, or Firm—Neuman, Williams, Anderson & Olson

[57] ABSTRACT

A baffle for use in a hydropneumatic shock absorber or damper particularly adapted for use with motor vehicles is provided. The damper employs a piston reciprocally movable within a cylinder filled with damping liquid and pressure gas. The baffle has guide projections which slidably engage the cylinder wall, apertures for passage of the damping liquid and is disposed between the gas and liquid. Baffle abutment means may be employed for limiting movement of the baffle into the damping liquid.

8 Claims, 4 Drawing Figures

HYDROPNEUMATIC VIBRATION DAMPER

The invention relates to hydropneumatic dampers intended primarily for use in powered vehicles, and in particular to baffle elements for use therein.

Hydropneumatic single tube oscillatory dampers or shock absorbers have a cylinder filled with damping liquid and pressure gas, a working piston provided with throttle openings for the damping liquid movably guided in the cylinder in the region occupied by the liquid, and a piston rod projecting through a seal downwardly from the piston outwardly of the cylinder. Such dampers may have a movable baffle element located beneath the interface between the pressure gas and the damping liquid, the element being provided at its outer periphery with guide projections slidably contacting the cylinder wall and having apertures for the passage of the damping fluid. The baffle element may be prevented from undergoing too deep a lowering movement into the damping liquid region by means of limiting abutment means.

In hydropneumatic single tube oscillatory dampers of this kind, the movable baffle element located beneath the interface between the pressure gas and the damping liquid has the purpose of so retarding or dispersing the upwardly flowing damping liquid passing through the throttle openings of the piston, as can occur with great energy on outward displacement of the piston, so far as possible so that it does not undergo any consequent turbulence or division at the surface of the liquid. Otherwise the damping fluid would become correspondingly foamed, so that the damping action would be substantially reduced and at the same time undersirable noise would occur. In order to reduce foam formation of this kind, sealing separator pistons have been used between the pressure gas space and the damping liquid (British Patent specification No. 740,920). These pistons produce a complete separation between the pressure gas and the damping liquid and thus provide most effective freedom from foam formation but they have the disadvantage of being rather expensive since they require specially machined cylinder inner surfaces over their working range. Therefore, attempts have already been made to employ baffle elements which consist of baffle plates or similar flow retarders rigidly located in the damper cylinder at appropriate positions (British Patent specification No. 1,028,780). By reason of these fixedly located baffle elements, the liquid streams flowing out from the working piston throttle openings on outward movement of the piston rod lose a large part of their energy. However, such fixed baffle element inserts produce additional turbulence or eddy currents of the damping liquid flowing past them particularly upon subsequent inward movement of the piston rod, where the flow eddies, which increase as the liquid level mounts, additionally disturb the liquid surface. In order to avoid this undesirable occurrence, it is customary in such single tube dampers to employ movably arranged baffle elements, which to the largest possible extent follow the movements of the liquid which occur on inward and outward travel of the piston rod or on the corresponding displacement of the liquid, in order in this way not to give rise to any additional liquid turbulence (British Patent specification No. 941,330).

In a known hydropneumatic single tube oscillatory damper of the kind mentioned above, the movable baffle element can consist of a hollow floating piston which is located in the damping liquid. Such floating pistons have a somewhat smaller diameter than the damper cylinder. In order to ensure proper guidance in the damper cylinder, the hollow floating piston is provided at its upper and lower sides with a sheet metal disc formed with a tooth-like shape at its periphery, the teeth of which form guide projections slidingly contacting the damper cylinder wall and the tooth gaps of which form apertures for the passage of the damping liquid. In order to prevent the floating piston from sinking too far in the damping liquid space, a screen insert is secured in the damping cylinder at a location against which the floating piston impinges on excessive outward movement of the piston rod and on the downward displacement of liquid which occurs as a consequence. However, such a screen in turn represents a fixed inserted body giving rise to undesirable turbulence of the damping liquid. Also, the hollow floating piston has considerable disadvantages, since it is not only difficult to manufacture and even more difficult to hold securely, but with its relatively sharp edged guide projections it tends to jam in the damper cylinder so that its freedom to move is consequently reduced which finally leads to corresponding turbulence of the damping liquid and to the foam formation connected therewith. This also holds for other movable baffle elements in the form of loose floating pistons guided in the damper cylinder, which tend to tilt or jam in the damper cylinder with even slightly inclined positions of the damper and because of vibration.

The invention accordingly provides a baffle element for use in a hydropneumatic damper, the element being of stamped sheet metal and having cylindrical segmental guide tongues at the periphery thereof for guiding the element within the cylinder of the damper, and apertures for the passage of damping fluid.

Such a baffle element can avoid the aforementioned defects of known baffle elements and can moreover be manufactured extremely cheaply, namely from an appropriately stamped and shaped sheet of metal. The baffle element can provide a saving in space and can operate without tilting or jamming; it can provide an effective distribution or regulation of the flow of the damping liquid produced by the working piston of the damper and it also enables rapid control of the degree of filling of the damping liquid. Thus, if through inversion of the damper, the pressure gas passes in a few seconds to the other end of the damper cylinder from which the piston rod extends, whereupon the fully withdrawn working piston is then pressed in so far as to reach the liquid surface, the state of filling can be directly determined.

The invention also provides a hydropneumatic single tube oscillatory damper having a damper cylinder containing damping liquid and pressure gas, a working piston provided with throttle openings for the damping liquid slidably guided in the cylinder, a piston rod extending from the piston in the downward direction in use and projecting through a seal from an end wall of the cylinder, a baffle element of the invention located below the interface between the pressure gas and the damping liquid, and abutment means for limiting movement of the baffle element downwardly within the cylinder in the position of use.

The baffle element can have a dished head or central portion projecting towards the pressure gas region so as to save space by receiving the clamping nut usually present at the upper end of the working piston within the dished portion in the inward position of the rod. Moreover, the guide tongues can be widely surfaced so as to loosely contact the damper cylinder wall and ensure a satisfactory sliding movement of the baffle element in the cylinder under all the operating conditions encountered in practice, even in inclined positions and under strong vibrations.

According to a particularly advantageous feature of the invention, the baffle element can have a circumferential flange from which the guide tongues are bent upwardly, arcuate recesses or gaps for the passage of the damping fluid being cut out between the guide tongues in the periphery of the flange. This therefore produces a further constructional simplification of the baffle member since its guide tongues lie at substantially the same level as its outwardly pressed or dished head portion whilst at the same time only a small axial height is required for the whole baffle element. The gaps present at the rim of the flange preferably together provide an area which substantially corresponds to the cross section of the piston rod. In this way the damping liquid can pass the baffle element substantially freely in practice even when the latter is located upon the limiting abutment means in the damper cylinder, so that liquid turbulence is virtually completely avoided.

The limiting abutment means preventing the baffle element from sinking too far into the damping liquid region can consist of a projection or projections formed at an appropriate level in the damper cylinder wall upon which the baffle element can rest by means of its peripheral flange. Alternatively, the limiting abutment means can comprise a clamping ring force-fitted into the damper cylinder. Such a clamping ring can advantageously consist of a corrugated spring metal strip, which is brought to the correct position in the damper cylinder by means of the working piston.

By way of illustration, embodiments of the invention are described below with reference to the accompanying drawings in which.

Figure 1:
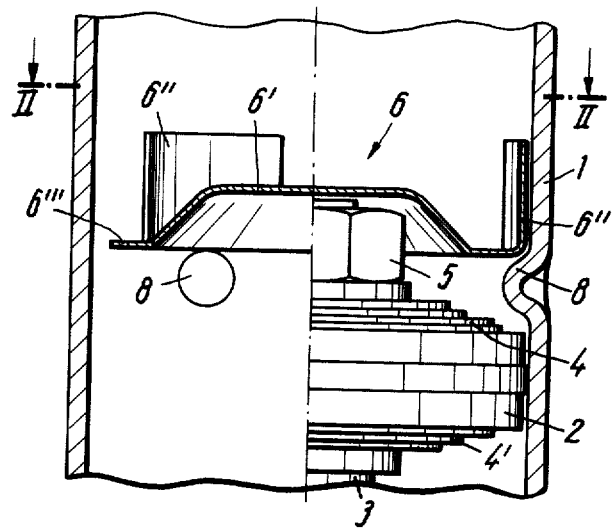
FIG. 1 is a partial sectional side view of a first hydropneumatic single tube damper including a baffle element in accordance with the invention.
Figure 2:
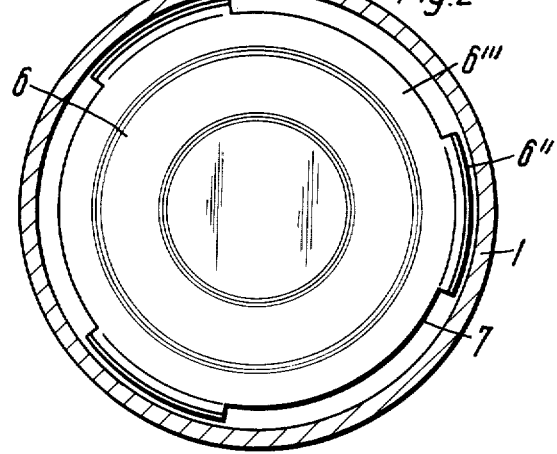
FIG. 2 is a cross-section view on the line II—II of FIG. 1.

The hydropneumatic single tube oscillatory damper partly shown in FIGS. 1 and 2 comprises a damper cylinder 1 which is filled with a pressure gas in its upper region (not shown) and is otherwise filled with damping liquid. In the region containing the damping liquid, a working piston 2 is received from movement together with a piston rod 3 which projects downwardly from the piston through a seal in the lower end of the cylinder 1. The working piston 2 is provided with throttle openings (not shown) for the passage of the damping liquid. The throttle openings are covered by centrally stressed valve spring discs 4, 4' which control the flow of damping liquid through the openings in one or other direction. By means of a clamping nut 5 the valve spring discs, together with the working piston 2, are secured to the inner end of the piston rod 3.

Below the interface between the pressure gas and the damping liquid, a movable baffle element 6 is provided in the damper cylinder 1 and this, in accordance with the invention, consists of a stamped sheet metal member with an outwardly dished or deformed head piston 6' projecting towards the pressure gas space, and cylindrical segmental guide tongues 6" extending parallel to the damper cylinder wall. The baffle element 6 preferably consists of sheet steel and has a circumferential flange 6''' from which the guide tongues 6" are upwardly bent, arcuate gaps 7 being provided between the guide tongues in the flange periphery for passage of the damping liquid. These gaps 7 cooperate to define a cross-sectional area which corresponds substantially to that of the piston rod 3. Preferably, as shown, the sheet metal baffle member has three guide tongues 6" and gaps 7 uniformly distributed about its circumference, the latter being approximately twice as wide in the circumferential direction as the guide tongues, as can be readily seen in particular from FIG. 2.

In order to set a lower limit to the movement of the sheet metal baffle member 6 into the damping liquid space, a projection or projections 8 are hot pressed at an appropriate level in the damper cylinder wall. The baffle member 6 normally rests on these projections by means of its peripheral flange but engagement can take place in the event of lifting movement and thus of liquid displacement in the damper cylinder as shown in FIG. 1.

Figure 3:
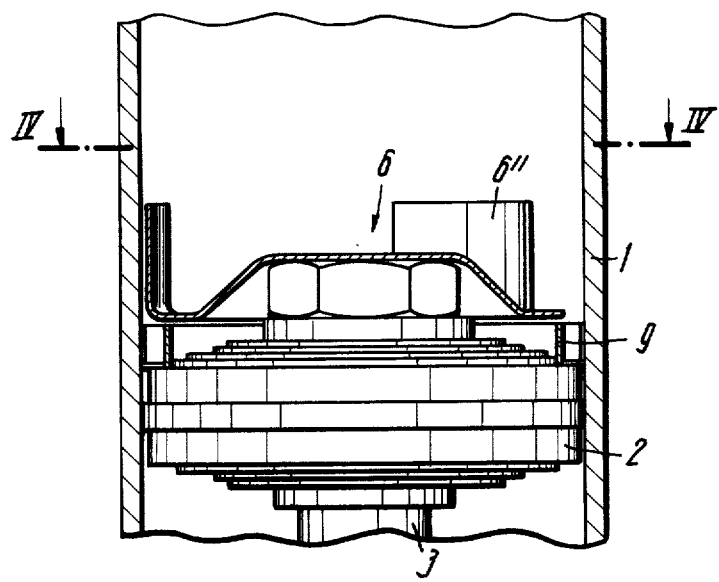
FIGS. 3 and 4 are views resembling those of FIGS. 1 and 2 respectively of a second hydropneumatic single tube damper including a baffle element in accordance with the invention.
Figure 4:
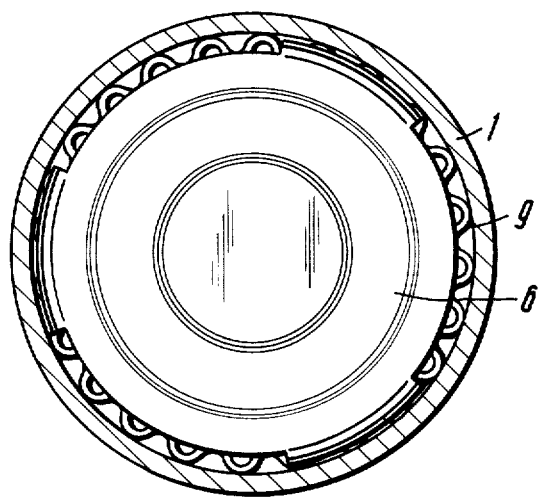

The embodiment illustrated in FIGS. 3 and 4 differs from that previously described in that a clamping ring 9 fitted into the damper cylinder 1 and secured to its wall to serve as the limiting abutment for the baffle member 6. This clamping ring advantageously consists of a corrugated flat spring strip, as shown in particular in FIG. 4. Installation of this corrugated clamping ring 9 can be effected simply by pushing the ring into the cylinder 1 by the working piston 2 into the lowest inward position of the piston rod 3. Again, the corrugated ring 9 serves to prevent excessive lowering of the baffle element 6 into the damping liquid space.

Various modifications of the illustrated dampers can be carried out within the scope of the present invention. For example, the baffle element 6 can also be shaped so that it has a substantially completely flat head part 6' with directly thereon guide tongues 6" which are downwardly directed. Generally speaking, such a construction of the sheet metal baffle member 6 is less advantageous than that illustrated, since in the latter a corresponding stiffening of the sheet metal baffle element is achieved by reason of the various contrary directions of the head part 6' and the guide tongue 6" so that the element can be stamped out from relatively thin sheet metal.

What we claim is:

1. A hydropneumatic single tube vibration absorber particularly adapted for use with motor vehicles, comprising a cylinder filled with damping liquid and a compressed gas, a working piston reciprocally movable within said cylinder in said damping liquid, a piston rod connected to said piston and extending to the exterior of said cylinder through a seal disposed at the point of piston rod penetration of said cylinder, a movable baffle disposed below the interface between said gas and damping liquid and having guide tongue projections on its outer periphery extending parallel to the logitudinal cylinder axis and adapted to slidably engage the cylinder wall, said baffle periphery having openings between said tongues for passage of said damping liquid; said tongues being of curvilinear sectional configuration so as to be able to engage adjacent wall portions of said cylinder in such manner that tilting and jamming of said baffle is avoided and said baffle is readily reciprocally movable in the normal course of absorber use, and stop means limiting the movement of said baffle into said damping liquid.

2. A single tube vibration absorber according to claim 1, characterized in that said baffle has a peripheral flange angularly disposed to a radially inwardly disposed portion of said baffle and with which said guide tongues are integrally formed; said arcuate recesses being cut from peripheral flange portions disposed between said tongues.

3. A single tube vibration absorber according to claim 2, characterized in that the recesses provided in said baffle flange have a combined area which corresponds approximately to the cross-sectional area of said piston rod.

4. A single tube vibration absorber according to claim 1, characterized in that the baffle has three guide tongues uniformly arranged about the baffle periphery and each recess has an arcuate length approximately double the arcuate width of each of said tongues.

5. A single tube vibration absorber according to claim 1, characterized in that the stop means limiting movement of the baffle into the damping fluid comprise projections formed at an appropriate level in the absorber cylinder wall; said baffle periphery engaging said projections.

6. A single tube vibration absorber according to claim 5, characterized in that the stop means comprise a clamping ring forced into the absorber cylinder in a friction fit and on which the baffle periphery is able to be supported.

7. A single tube vibration absorber according to claim 6, characterized in that the clamping ring consists of a corrugated spring plate strip.

8. The single tube vibration absorber of claim 1 in which said baffle is an integral member stamped and formed from sheet metal and has a dished central portion projecting in the direction of the pressurized gas zone in said cylinder, said baffle dished portion being adapted to receive the innermost portion of said piston when retracted into said cylinder.

\* \* \* \* \*